United States Patent
Chang et al.

(10) Patent No.: US 9,510,004 B2
(45) Date of Patent: Nov. 29, 2016

(54) MULTI-LAYERED RATE CONTROL FOR SCALABLE VIDEO CODING

(71) Applicant: Microsoft Technology Licensing, LLC, Redmond, WA (US)

(72) Inventors: Cheng Chang, Redmond, WA (US); Chih-Lung Lin, Redmond, WA (US); Ming-Chieh Lee, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 375 days.

(21) Appl. No.: 13/916,278

(22) Filed: Jun. 12, 2013

(65) Prior Publication Data

US 2014/0369405 A1 Dec. 18, 2014

(51) Int. Cl.
| | |
|---|---|
| H04N 7/12 | (2006.01) |
| H04N 19/31 | (2014.01) |
| H04N 19/124 | (2014.01) |
| H04N 19/172 | (2014.01) |
| H04N 19/46 | (2014.01) |
| H04N 19/152 | (2014.01) |
| H04N 19/187 | (2014.01) |
| H04N 19/33 | (2014.01) |

(52) U.S. Cl.
CPC ............ *H04N 19/31* (2014.11); *H04N 19/124* (2014.11); *H04N 19/152* (2014.11); *H04N 19/172* (2014.11); *H04N 19/187* (2014.11); *H04N 19/46* (2014.11); *H04N 19/33* (2014.11)

(58) Field of Classification Search
CPC .. H04N 19/31; H04N 19/124; H04N 19/152; H04N 19/172; H04N 19/187; H04N 19/46; H04N 19/33

USPC ............................................ 375/240, 240.03
See application file for complete search history.

(56) References Cited

U.S. PATENT DOCUMENTS

| | | | |
|---|---|---|---|
| 6,925,120 B2 | 8/2005 | Zhang et al. | |
| 6,937,770 B1* | 8/2005 | Oguz et al. | 382/235 |
| 7,391,807 B2 | 6/2008 | Lin et al. | |
| 7,974,341 B2 | 7/2011 | Chen et al. | |
| 2007/0280349 A1* | 12/2007 | Prieto et al. | 375/240.03 |
| 2013/0028316 A1 | 1/2013 | Leontaris et al. | |
| 2014/0341302 A1* | 11/2014 | Wang | 375/240.26 |
| 2014/0355671 A1* | 12/2014 | Peng et al. | 375/240.03 |

OTHER PUBLICATIONS

Sanz-Rodriguez, et al., "In-Layer Multi-Buffer Framework for Rate-Controlled Scalable Video Coding", In IEEE Transactions on Circuits and Systems for Video Technology, vol. 22, Issue 8, Aug. 2012, 15 pages.

(Continued)

*Primary Examiner* — Gims Philippe
*Assistant Examiner* — Benjamin Pezzner
(74) *Attorney, Agent, or Firm* — Tom Wong; Micky Minhas

(57) ABSTRACT

Systems and methods for multi-layered rate control for scalable video coding. A parameter value may be calculated based on a current layer target bit rate and a current layer buffer state for a frame in a video stream. The frame may include a lower layer and one or more higher layers. A determination may then be made as to whether the current layer is the lower layer. If the current layer is the lower layer, a determination may then be made as to whether a coupling request has been received from a higher layer in the frame. If the coupling request has been received from the higher layer in the frame, the parameter value for the current layer may be increased based on a buffer state threshold value of the higher layer in the frame.

21 Claims, 7 Drawing Sheets

(56) References Cited

OTHER PUBLICATIONS

Hu, et al., "Rate Control Optimization for Temporal-Layer Scalable Video Coding", In IEEE Transactions on Circuits and Systems for Video Technology, vol. 21, Issue 8, Aug. 2011, 11 pages.

Rodriguez-Escalona, Sergio Sanz, "A Rate Control Algorithm for Scalable Video Coding", Retrieved on: Apr. 23, 2013, Available at: http://e-archivo.uc3m.es/bitstream/10016/12546/1/Tesis_Sergio_Sanz_Rodriguez_Escalona.pdf.

Vizzotto, et al., "A Model Predictive Controller for Frame-Level Rate Control in Multiview Video Coding", In IEEE International Conference on Multimedia and Expo, Jul. 9, 2012, 6 pages.

* cited by examiner

MOBILE COMPUTING DEVICE

MULTI-LAYERED RATE CONTROL FOR SCALABLE VIDEO CODING

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

In videoconferencing applications, a video stream (e.g., webcam video) is typically sent from a presenter/sender to multiple participants/receivers. Depending on various bandwidth requirements and the capabilities of the various receiver devices, different receivers may request different resolutions or different bit rates of the presenter's video. In order to address this issue (and to prevent the sender from having to encode different individual video streams for each receiver) the sender typically encodes a single stream which is dispatched by a video server and subsequently split into several individual streams having frame rates suitable for the various receivers. For example, for a video conferencing stream from a sender, a first receiver may request VGA video at 30 frames per second and a second receiver may request VGA video at 15 frames per second. In this scenario, the sender would encode the video at 30 frames per second to meet the requirements of the first receiver for the video server which would in turn "scale" the video (using a rate controller) so that it drops every other frame to meet the requirements of the second receiver. However, there are several drawbacks associated with the aforementioned scaling approach. One drawback associated with current rate controllers is that they must independently control a quantization parameter for multiple layers utilized in the scaling of video. However, current rate controllers are unable to accomplish this without introducing flicker which results in less than optimal video quality for the receivers. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for multi-layered rate control for scalable video coding. A parameter value may be calculated by a computing device based on a current layer target bit rate and a current layer buffer state for a frame in a video stream. The frame may include a lower layer and one or more higher layers. A determination may then be made as to whether the current layer is the lower layer. If the current layer is the lower layer, a determination may then be made as to whether a coupling request has been received from a higher layer in the frame. If the coupling request has been received from the higher layer in the frame, the parameter value for the current layer may be increased by the computing device based on a buffer state threshold value of the higher layer in the frame.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for multi-layered rate control for scalable video coding. A parameter value may be calculated by a computing device based on a current layer target bit rate and a current layer buffer state for a frame in a video stream. The frame may include a lower layer and one or more higher layers. A determination may then be made as to whether the current layer is the lower layer. If the current layer is the lower layer, a determination may then be made as to whether a coupling request has been received from a higher layer in the frame. If the coupling request has been received from the higher layer in the frame, the parameter value for the current layer may be increased by the computing device based on a buffer state threshold value of the higher layer in the frame.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
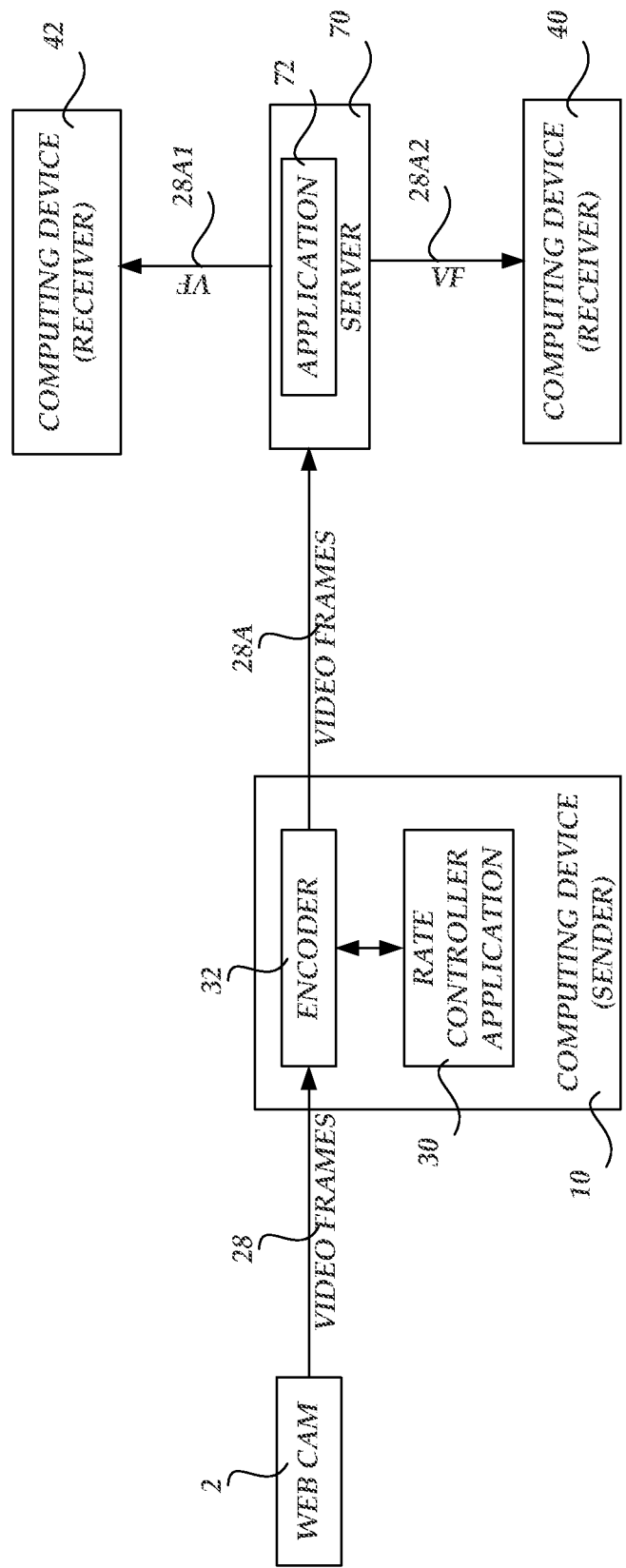
FIG. 1 is a block diagram illustrating a network architecture for multi-layered rate control for scalable video coding, in accordance with an embodiment.

Referring now to the drawings, in which like numerals represent like elements through the several figures, various aspects of the present invention will be described. FIG. 1 is a block diagram illustrating a network architecture for multi-layered rate control for scalable video coding, in accordance with an embodiment. The network architecture includes a computing device 10 which is in communication with a web cam 2 and computing devices 40 and 42, through a server 70. The computing device 10 may be configured as a sender for receiving a video stream comprising video frames 28, from the web cam 2, for transmission to receiver computing devices 40 and 42. For example, in the network architecture of FIG. 1 may be configured for providing a videoconferencing session between the computing devices 10, 40 and 42 while complying with varying bandwidth requirements.

The computing device 10 may comprise a rate controller application 30 and an encoder 32. In accordance with an embodiment, the rate controller application 30 may provide instructions to the encoder 32 for encoding the video frames 28 in accordance with bandwidth requirements associated with the computing devices 40 and 42. For example, if the computing device 40 requests VGA video at 30 frames per second and the computing device 42 requests VGA video at 15 frames per second, then the rate controller application 30 would instruct the encoder 32 to encode the video frames 28 accordingly (utilizing temporal scaling) resulting in video frames 28A being transmitted to the server 70. Once the video frames 28A have been received by the server 70, the appropriate video frames having the requested frame rates (i.e., the video frames 28A1 and 28A2) may then be transmitted to the computing devices 40 and 42. It should be understood that the encoder 32 may be implemented either in hardware or as software.

In accordance with an embodiment, and as will be described in greater detail below with respect to FIG. 4, the rate controller application 30 may be configured to utilize multi-layered rate control for scalable video coding including adjusting a compression parameter (i.e., a quantization parameter) to better achieve target bit rates (e.g., frame rates) without a significant reduction in video quality. Reduced video quality may be exhibited, for example, by flickering. In accordance with an embodiment, the rate controller application 30, as well as the application 72, may comprise a unified communications platform which may include, but is not limited to, functionality for instant messaging, presence, file transfer, peer-to-peer and multi-party voice and video calling, ad hoc and structured conferences (audio, video and web) and public switched telephone network ("PSTN") connectivity. An illustrative unified communications platform which may be utilized with the various embodiments described herein is the LYNC enterprise-ready unified communications platform software from MICROSOFT CORPORATION of Redmond, Wash. It should be understood, however, that other communications platform software from other manufacturers may alternatively be utilized in accordance with the various embodiments described herein.

Figure 2:
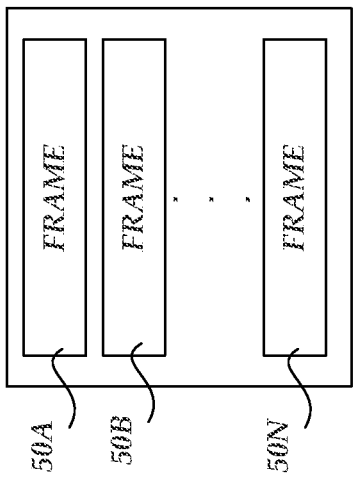
FIG. 2 is a block diagram illustrating individual video frames in the network architecture of FIG. 1, in accordance with an embodiment.

FIG. 2 is a block diagram illustrating individual video frames in the network architecture of FIG. 1, in accordance with an embodiment. The video frames 28 of FIG. 1 may comprise multiple frames including frames 50A and 50B-50N. As will be discussed in greater detail below, with respect to FIG. 3, each of the frames 50A and 50B-50N may include a base layer and one or more enhancement layers.

Figure 3:
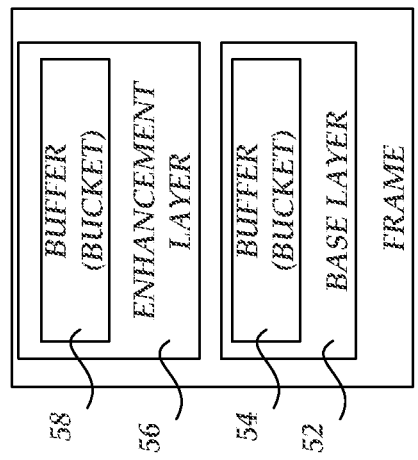
FIG. 3 is a block diagram illustrating layers in a video frame of FIG. 2, in accordance with an embodiment.

FIG. 3 is a block diagram illustrating layers in a video frame of FIG. 2, in accordance with an embodiment. For example, the video frame 50A may comprise a base layer 52 and an enhancement layer 56. It should be understood that in accordance with other embodiments, the video frame 50A may comprise one or more additional enhancement layers. Both the base layer 52 the enhancement layer 56 may each comprise buffers (or buckets) 54 and 58. In accordance with an embodiment, the buffers 54 and 58 may each comprise a "leaky bucket" which, as known to those skilled in the art, is a theoretical buffer which may be utilized by the encoder 32. In particular, every time the encoder 32 encodes a video frame, all of the bits making up the frame are input into a buffer. At the same time bits are being input into the buffer, other bits are draining (or leaking out of) the buffer at a constant bit rate that's determined by bandwidth. As will be described in greater detail below with respect to FIG. 4, the rate controller application 30 may utilized the buffer 54 to determine a parameter (e.g., a quantization parameter) for the base and enhancement layers 52 and 56 which will enable the rate controller application 30 to better achieve a target bitrate for each layer and avoid flickering.

Figure 4:
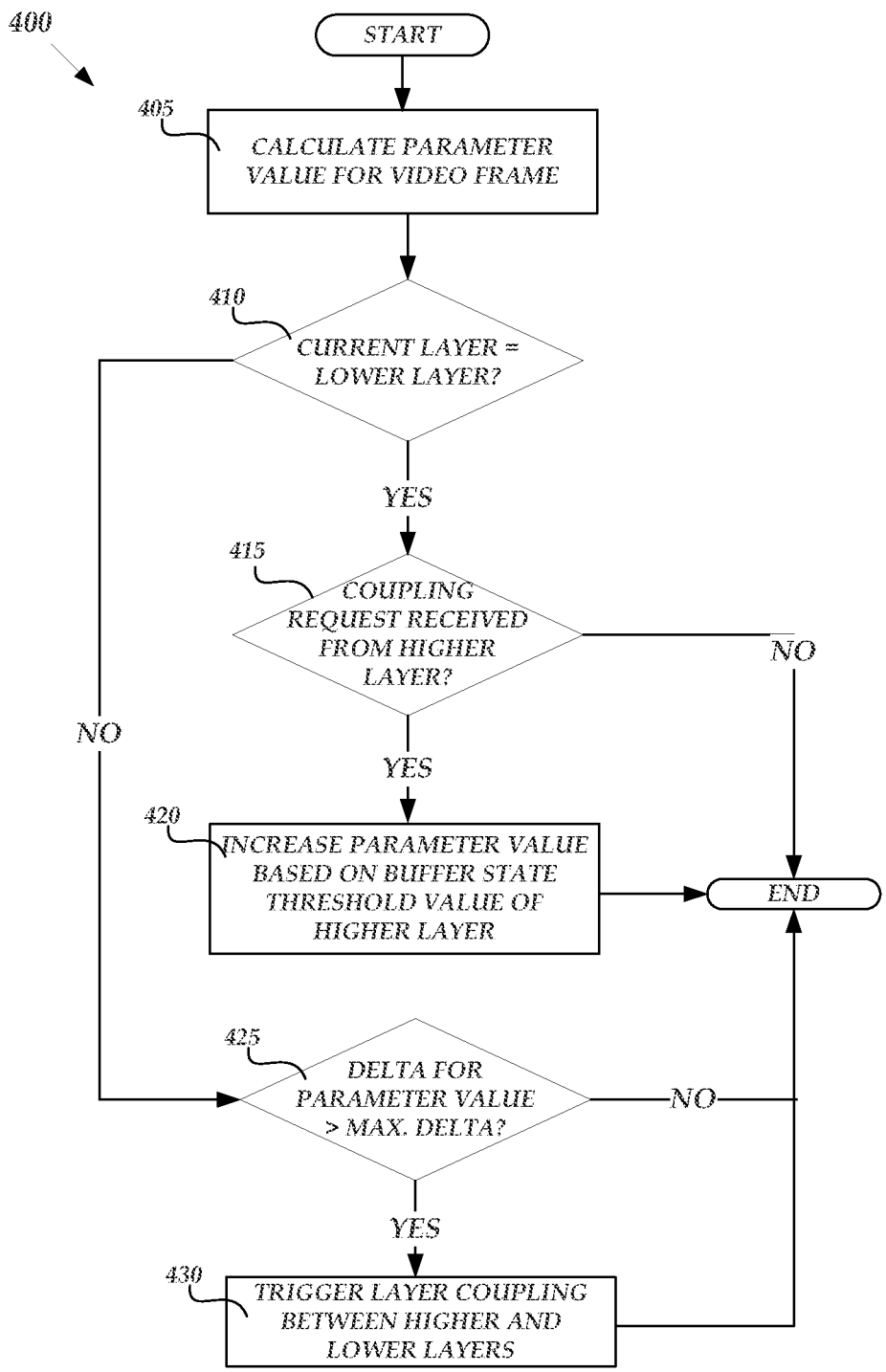
FIG. 4 is a flow diagram illustrating a routine for multi-layered rate control for scalable video coding, in accordance with an embodiment.

FIG. 4 is a flow diagram illustrating a routine 400 for multi-layered rate control for scalable video coding, in accordance with an embodiment. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIG. 4 and making up the various embodiments described herein are referred to variously as operations, structural devices, acts or modules. It will be recognized by one skilled in the art that these operations, structural devices, acts and modules may be implemented in software, in hardware, in firmware, in special purpose digital logic, and any combination thereof without deviating from the spirit and scope of the present invention as recited within the claims set forth herein.

The routine 400 begins at operation 405, where the rate controller application 30, executing on the computing device 10, may instruct the encoder 32 to calculate a parameter value for one of the video frames 28 (e.g., the video frame 50A). In particular, the encoder 32 may be instructed to calculate a desired quantization parameter (QP) for a current layer (i.e., the base layer 52 or the enhancement layer 56) in the video frame 50A based on a target bitrate and the buffer (i.e., leaky bucket) state for that layer. In particular, and in accordance with an embodiment, the QP parameter may be derived as a function of the following: (1) The current layer's target bitrate; (2) the current layer's leaky bucket fullness; and (3) the sizes of previously encoded frames. For example, if the current layer is determined to be the base layer 52 (i.e., the lower layer) in the video frame 50A, the desired QP will be calculated based on the target bitrate and the current bucket state for the base layer 52. Similarly, if the current layer is determined to be the enhancement layer 56 (i.e., the higher layer) in the video frame 50A, the desired QP will be calculated based on the target bitrate and the current bucket state for the enhancement layer 56. It should be understood that the current layer may be determined based on a layer ID in a given frame which is received by the encoder 32. That is, the encoder 32 may be given a frame at a particular layer "1", with 0<=1<L being the layer ID, where L is the number of layers present in a bitstream (e.g., the video frames 28). It should be further understood that the rate controller application 30 may also be configured to define a maximum delta QP (e.g., MAX_DELTAQP) and a minimum delta QP (e.g., MIN_DELTAQP) that can exist in between two neighboring layers. In accordance with an embodiment, the MAX_DELTAQP>=0 and 0<=MIN_DELTAQP<MAX_DELTAQP. In accordance with an embodiment, the range between the MIN_DELTAQP and MAX_DELTAQP (i.e., [MIN_DELTAQP, MAX_DELTAQP] may be set to [0, 6]. However, it should be understood other ranges may also be utilized depending on the type of video content. For example, for fast motion video content where quality flickering may not be as noticeable, [MIN_DELTAQP, MAX_DELTAQP] may be made larger so that the rate controller application 30 may better achieve target bitrates. It should further be understood that prior undergoing encoding operations, the rate controller application 30 may be configured to initialize a layer coupling flag (e.g., flag LayerCoupling[1]=false). As will be described in greater detail below, the layer coupling flag may be utilized to signal whether a coupling exists between the base layer 52 (e.g., layer "1-1") and the enhancement layer 56 (e.g., layer "1"). It should be understood that layer coupling is employed to prevent a delta between two neighboring layers in a frame (e.g., the base layer 52 and the enhancement layer 56) from becoming too large by increasing the QP of the base layer in a video frame.

From operation 405, the routine 400 continues to operation 410, where the rate controller application 30, executing on the computing device 10, may instruct the encoder 32 to determine whether the current layer is the lower layer (i.e., determine whether the current layer is the base layer 52). If, at operation 410, it is determined that the current layer is the base layer 52 (i.e., the current layer is not a higher layer), then the routine 400 continues to operation 415. If however, at operation 410, it is determined that the current layer is not the base layer 52 (i.e., the current layer is the enhancement layer 56), then the routine 400 branches to operation 425.

At operation 415, the rate controller application 30, executing on the computing device 10, may instruct the encoder 32 to determine the QP based on a determination as to whether a coupling request has been received from a higher layer (e.g., the enhancement layer 56). If, at operation 415, it is determined that a layer coupling request has been received (i.e., the delta between the base layer QP and the enhancement layer QP is greater than the predetermined maximum delta), then the routine 400 continues to operation 420 where the QP for the lower layer (e.g., the base layer 52) may be adjusted. If however, at operation 410, it is determined that a layer coupling request has not been received, then the QP does not need adjustment and the routine 400 then ends.

At operation 420, the rate controller application 30, executing on the computing device 10, may instruct the encoder 32 to increase or elevate the QP based on a buffer state threshold value of a higher layer (i.e., the enhancement layer 36) in the video frame 50A. In accordance with an embodiment, the rate controller application 30 may utilize the following algorithm to adjust the QP:

---
Let dQP = QP[l+1] − QP[l]. // QP[l+1] is the QP used for the higher layer in the previous frame.
    If (LayerCoupling[l+1] == true)
        i. iMinQP = 0;
        ii. if (B[l+1] > 90%), let iMinQP = QP[l+1];
        iii. if (B[l+1] > 80%), let iMinQP = QP[l+1] − 1;
        iv. if (B[l+1]>70%), let iMinQP=QP[l+1]−2;
        v. iMinQP = max(QP[l+1] − MAX_DELTAQP, iMinQP);
        vi. QP[l]= max(QP[l], iMinQP).
---

As may be understood from the above algorithm, when the enhancement layer buffer 58 (i.e., B[l+1]) is greater than 90% full, the QP for the base layer 52 may be set to the QP for the enhancement layer 56, when the enhancement layer buffer 58 (i.e., B[l+1]) is greater than 80% full, the QP for the base layer 52 may be set to one less than the QP for the enhancement layer 52, and when the enhancement layer buffer 58 (i.e., B[l+1]) is greater than 70% full, the QP for the base layer 52 may be set to two less than the QP for the enhancement layer 52. It should be understood that in accordance with an alternative embodiment, the QP for the base layer 52 may also be raised by simply adding a delta QP to the QP for the base layer 52. From operation 420, the routine 400 then ends.

At operation 425, upon determining that the current layer in the video frame 50A is not the lower layer (i.e., the current layer is the enhancement layer 56), then the rate controller application 30, executing on the computing device 10, may instruct the encoder 32 to determine whether the delta for the QP between layers is greater than the MAX_DELTAQP discussed above at operation 405. If, at operation 425, the delta for the QP between layers is determined to be greater than the MAX_DELTAQP, then the routine 400 continues to operation 430. Otherwise, the routine 400 then ends.

At operation 430, the rate controller application 30, executing on the computing device 10, may instruct the encoder 32 to trigger layer coupling between the higher and lower layers (e.g., the enhancement layer 56 and the base layer 52) in the video frame 50A. In particular, the rate controller application 30 may instruct the encoder 32 to trigger layer coupling when the delta relative to the lower layer exceeds the MAX_DELTAQP. In accordance with an embodiment, the rate controller application 30 may utilize the following algorithm to trigger layer coupling:

---
dQP = QP[l] − QP[l−1].
If dQP > MAX_DELTAQP − 1:
    i. QP[l] = QP[l−1] + MAX_DELTAQP
    ii. If (B[l] > 60%):
        1. LayerCoupling[l] = true.
Else
    i. If (LayerCoupling[l] == true), and if B[l] < 35%, and if QP[l] is decreasing compared to previous frame:
        1. Set LayerCoupling[l] = false.
    ii. If dQP < MIN_DELTAQP
        1. Set QP[l] = QP[l−1] + MIN_DELTAQP.
---

As may be understood from the above algorithm, layer coupling is triggered when the base layer buffer 54 (i.e., B[1]) is greater than 60% full and if the DELTAQP exceeds or is equal to the MAX_DELTAQP. However, if B[1] decreases to less than 35% full and if the QP for the base layer 52 is decreasing as compared to a previous frame, then the rate controller application 30 may instruct the encoder 32 to turn off layer coupling as it is no longer needed (i.e., the QP for the base layer 52 no longer exceeds the MAX_DELTAQP). Moreover, if the QP for the base layer 52 falls below the MIN_DELTAQP, then the rate controller application 30 may instruct the encoder 32 to set the QP for the base layer 52 to a value equal to the sum of QP for the enhancement layer 56 and the MIN_DELTAQP. From operation 430, the routine 400 then ends.

It should be understood that with respect to the operations 405 through 430 of the routine 400, discussed above, the MIN_DELTAQP and MAX_DELTAQP may be different from layer to layer and may further be made adaptive based on content. It should be further understood that the specific buffer (i.e., bucket) levels used to determine the various QPs may be tuned. It should also be appreciated that in accordance with the above-described embodiments, coupling is determined by the higher (i.e., enhancement) layer's buffer state. Thus, if an enhancement layer has a risk of buffer overflow, then the QP of the base layer should be raised, if possible. Finally, while the operations 405 through 430 are described as being applied to temporal scalability (i.e., multiple video streams having a fixed quality, the same resolution and different frame rates), they may also be applied to spatial scalability (i.e., multiple video streams having a fixed quality but different resolutions) and quality scalability (i.e., multiple video streams having the same resolution, the same frame rate but different quality) as well.

Figure 5:
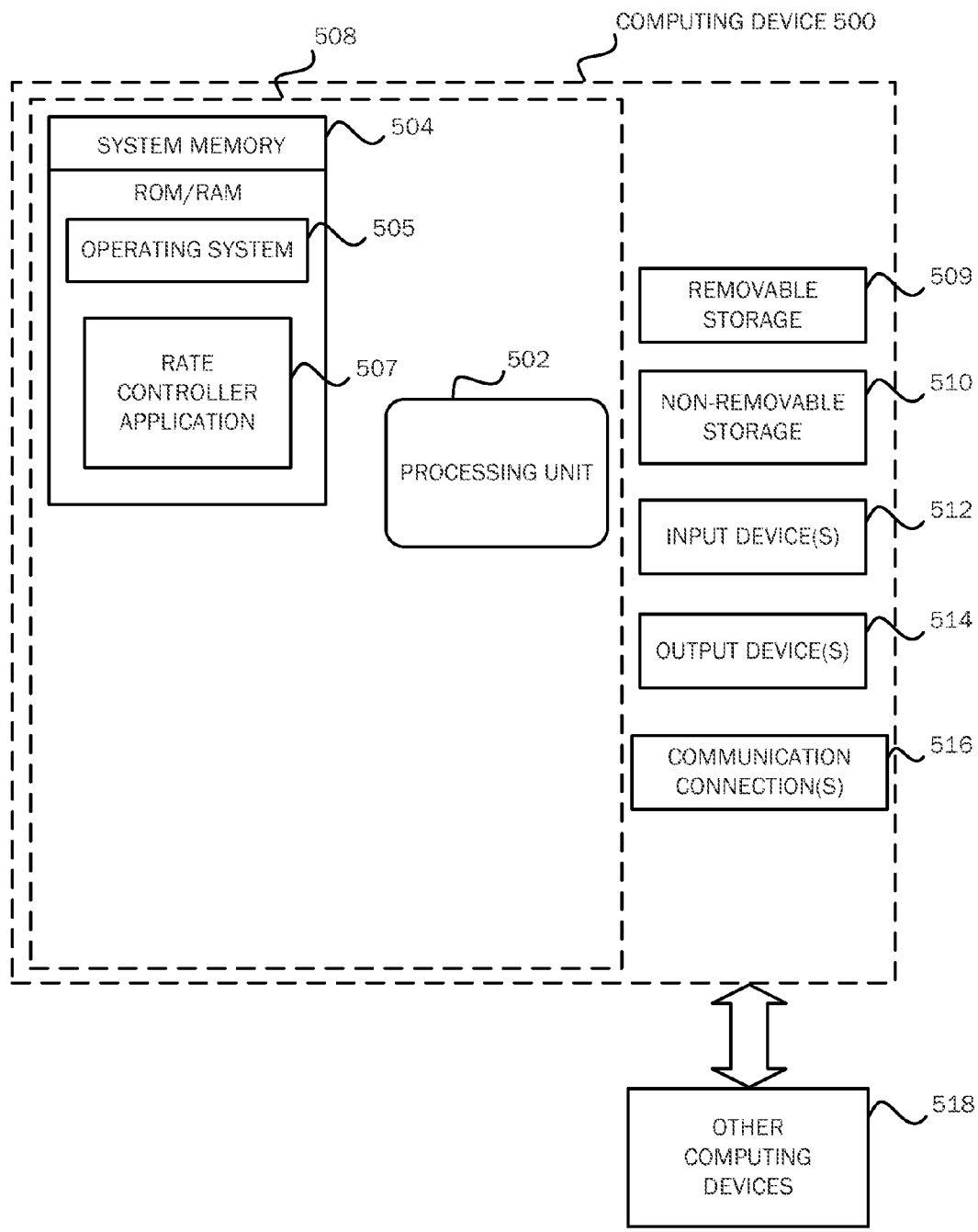
FIG. 5 is a simplified block diagram of a computing device with which various embodiments may be practiced.
Figure 6A:
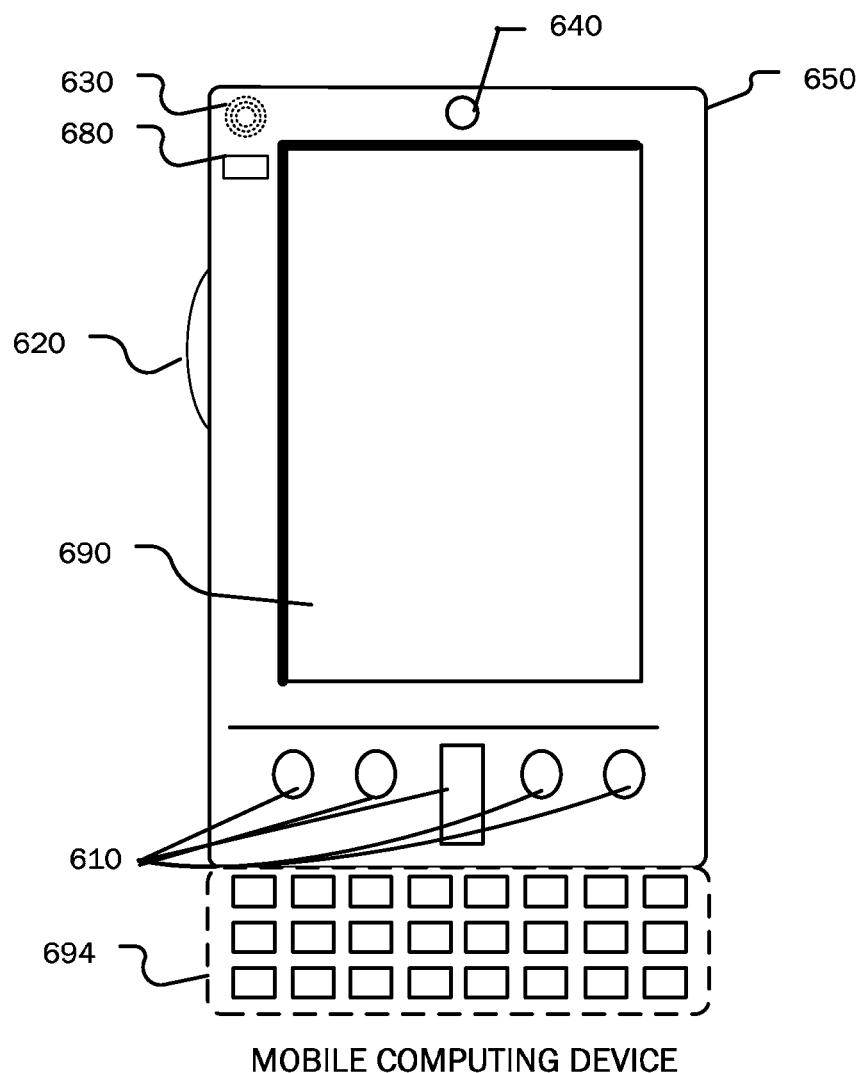
FIG. 6A is a simplified block diagram of a mobile computing device with which various embodiments may be practiced.
Figure 6B:
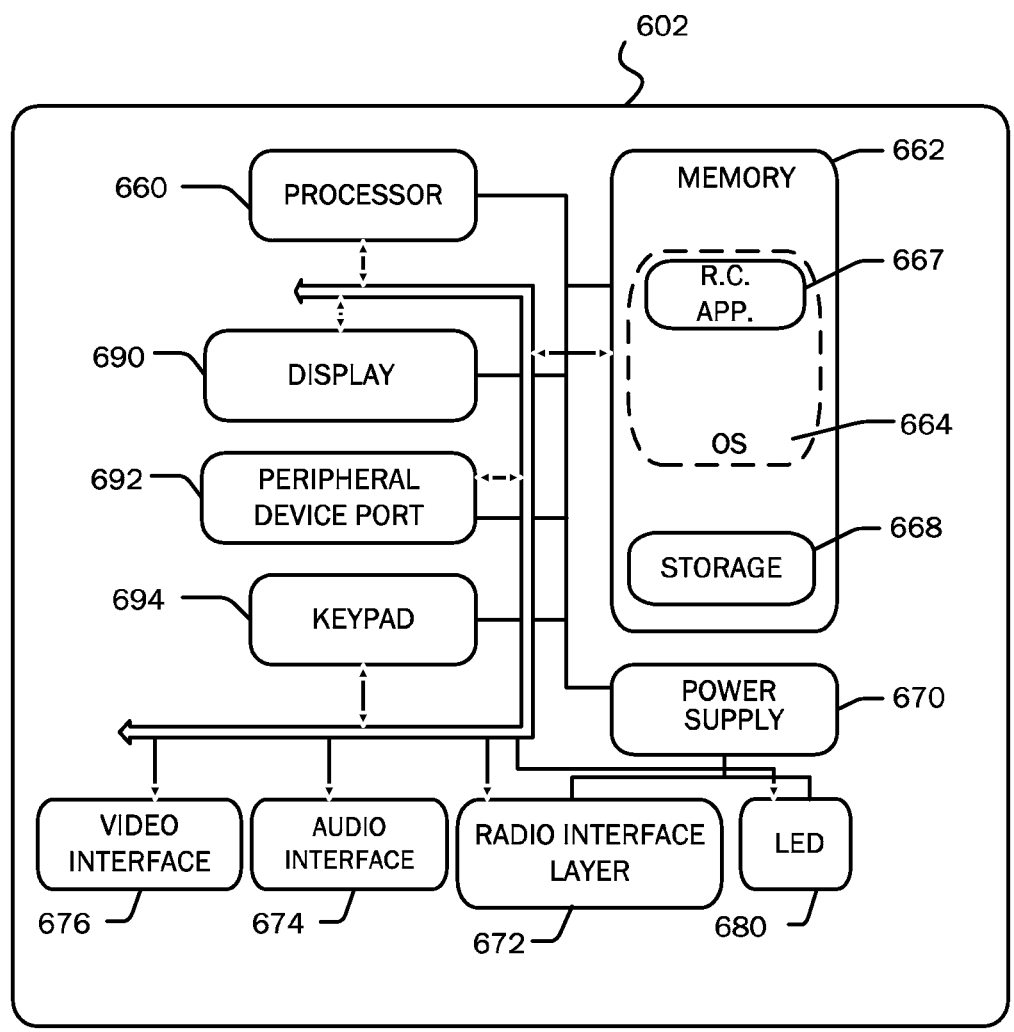
FIG. 6B is a simplified block diagram of a mobile computing device with which various embodiments may be practiced.
Figure 7:
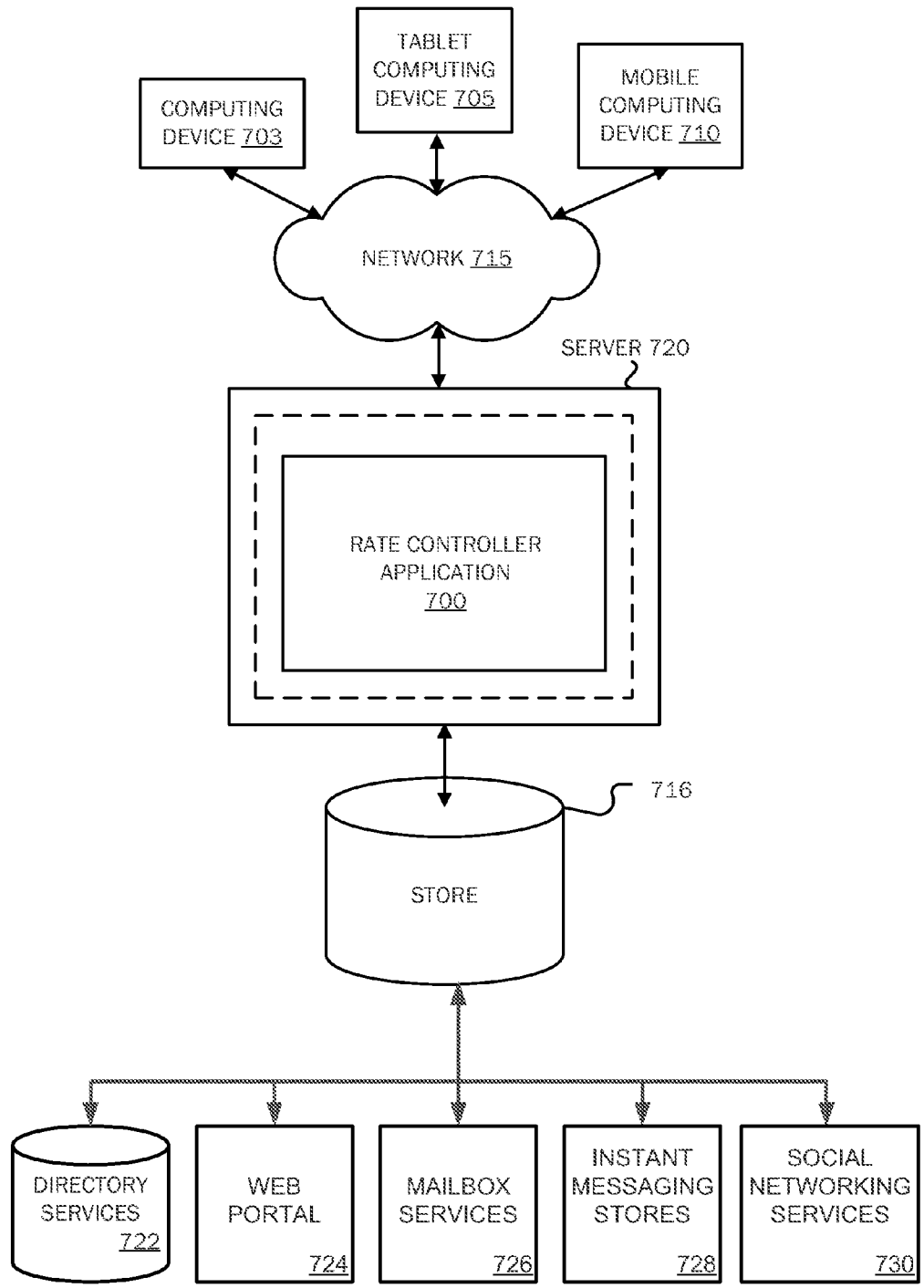
FIG. 7 is a simplified block diagram of a distributed computing system in which various embodiments may be practiced.

FIGS. 5-7 and the associated descriptions provide a discussion of a variety of operating environments in which embodiments of the invention may be practiced. However, the devices and systems illustrated and discussed with respect to FIGS. 5-7 are for purposes of example and illustration and are not limiting of a vast number of computing device configurations that may be utilized for practicing embodiments of the invention, described herein.

FIG. 5 is a block diagram illustrating example physical components of a computing device 500 with which various embodiments may be practiced. In a basic configuration, the computing device 500 may include at least one processing unit 502 and a system memory 504. Depending on the configuration and type of computing device, system memory 504 may comprise, but is not limited to, volatile (e.g. random access memory (RAM)), non-volatile (e.g. read-only memory (ROM)), flash memory, or any combination. System memory 504 may include an operating system 505 and rate controller application 507. Operating system 505, for example, may be suitable for controlling the computing device 500's operation and, in accordance with an embodiment, may comprise the WINDOWS operating systems from MICROSOFT CORPORATION of Redmond, Wash. The rate controller application 507, for example, may comprise functionality for performing routines including, for example, multi-layered rate control for scalable video coding, as described above with respect to the operation in routine 400 of FIG. 4. It should be understood, however, that the embodiments described herein may also be practiced in conjunction with other operating systems and application programs and further, is not limited to any particular application or system.

The computing device 500 may have additional features or functionality. For example, the computing device 500 may also include additional data storage devices (removable and/or non-removable) such as, for example, magnetic disks, optical disks, solid state storage devices ("SSD"), flash memory or tape. Such additional storage is illustrated in FIG. 5 by a removable storage 509 and a non-removable storage 510. The computing device 500 may also have input device(s) 512 such as a keyboard, a mouse, a pen, a sound input device (e.g., a microphone), a touch input device for receiving gestures, an accelerometer or rotational sensor, etc. Output device(s) 514 such as a display, speakers, a printer, etc. may also be included. The aforementioned devices are examples and others may be used. The computing device 500 may include one or more communication connections 516 allowing communications with other computing devices 518. Examples of suitable communication connections 516 include, but are not limited to, RF transmitter, receiver, and/or transceiver circuitry; universal serial bus (USB), parallel, and/or serial ports.

Furthermore, various embodiments may be practiced in an electrical circuit comprising discrete electronic elements, packaged or integrated electronic chips containing logic gates, a circuit utilizing a microprocessor, or on a single chip containing electronic elements or microprocessors. For example, various embodiments may be practiced via a system-on-a-chip ("SOC") where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may operate via application-specific logic integrated with other components of the computing device/system 500 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 6A and 6B illustrate a suitable mobile computing environment, for example, a mobile computing device 650 which may include, without limitation, a smartphone, a tablet personal computer, a laptop computer, and the like, with which various embodiments may be practiced. With reference to FIG. 6A, an example mobile computing device 650 for implementing the embodiments is illustrated. In a basic configuration, mobile computing device 650 is a handheld computer having both input elements and output elements. Input elements may include touch screen display 625 and input buttons 610 that allow the user to enter information into mobile computing device 650. Mobile computing device 650 may also incorporate an optional side input element 620 allowing further user input. Optional side input element 620 may be a rotary switch, a button, or any other type of manual input element. In alternative embodiments, mobile computing device 650 may incorporate more or less input elements. In yet another alternative embodiment, the mobile computing device is a portable telephone system, such as a cellular phone having display 625 and input buttons 610. Mobile computing device 650 may also include an optional keypad 605. Optional keypad 605 may be a physical keypad or a "soft" keypad generated on the touch screen display.

Mobile computing device 650 incorporates output elements, such as display 625, which can display a graphical user interface (GUI). Other output elements include speaker 630 and LED 680. Additionally, mobile computing device 650 may incorporate a vibration module (not shown), which causes mobile computing device 650 to vibrate to notify the user of an event. In yet another embodiment, mobile computing device 650 may incorporate a headphone jack (not shown) for providing another means of providing output signals.

Although described herein in combination with mobile computing device 650, in alternative embodiments may be used in combination with any number of computer systems, such as in desktop environments, laptop or notebook computer systems, multiprocessor systems, micro-processor based or programmable consumer electronics, network PCs, mini computers, main frame computers and the like. Various embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate the various embodiments described herein.

FIG. 6B is a block diagram illustrating components of a mobile computing device used in one embodiment, such as the mobile computing device 650 shown in FIG. 6A. That is, mobile computing device 650 can incorporate a system 602 to implement some embodiments. For example, system 602 can be used in implementing a "smartphone" that can run one or more applications similar to those of a desktop or notebook computer. In some embodiments, the system 602 is integrated as a computing device, such as an integrated personal digital assistant (PDA) and wireless phone.

Rate controller application 667 may be loaded into memory 662 and run on or in association with an operating system 664. The system 602 also includes non-volatile storage 668 within memory the 662. Non-volatile storage 668 may be used to store persistent information that should not be lost if system 602 is powered down. The rate controller application 667 may use and store information in the non-volatile storage 668. The rate controller application 667 may also include functionality for performing routines including, for example, multi-layered rate control for scalable video coding, as described above with respect to the operation in routine 400 of FIG. 4. A synchronization application (not shown) also resides on system 602 and is programmed to interact with a corresponding synchronization application resident on a host computer to keep the information stored in the non-volatile storage 668 synchronized with corresponding information stored at the host computer. As should be appreciated, other applications may also be loaded into the memory 662 and run on the mobile computing device 650.

The system 602 has a power supply 670, which may be implemented as one or more batteries. The power supply 670 might further include an external power source, such as an AC adapter or a powered docking cradle that supplements or recharges the batteries.

The system 602 may also include a radio 672 (i.e., radio interface layer) that performs the function of transmitting and receiving radio frequency communications. The radio 672 facilitates wireless connectivity between the system 602 and the "outside world," via a communications carrier or service provider. Transmissions to and from the radio 672 are conducted under control of OS 664. In other words, communications received by the radio 672 may be disseminated to the rate controller application 667 via OS 664, and vice versa.

The radio 672 allows the system 602 to communicate with other computing devices, such as over a network. The radio 672 is one example of communication media. The embodiment of the system 602 is shown with two types of notification output devices: the LED 680 that can be used to provide visual notifications and an audio interface 674 that can be used with speaker 630 to provide audio notifications. These devices may be directly coupled to the power supply 670 so that when activated, they remain on for a duration dictated by the notification mechanism even though processor 660 and other components might shut down for conserving battery power. The LED 680 may be programmed to remain on indefinitely until the user takes action to indicate the powered-on status of the device. The audio interface 674 is used to provide audible signals to and receive audible signals from the user. For example, in addition to being coupled to speaker 630, the audio interface 674 may also be coupled to a microphone (not shown) to receive audible (e.g., voice) input, such as to facilitate a telephone conversation. In accordance with embodiments, the microphone may also serve as an audio sensor to facilitate control of notifications. The system 602 may further include a video interface 676 that enables an operation of on-board camera 640 to record still images, video streams, and the like.

A mobile computing device implementing the system 602 may have additional features or functionality. For example, the device may also include additional data storage devices (removable and/or non-removable) such as, magnetic disks, optical disks, or tape. Such additional storage is illustrated in FIG. 6B by storage 668.

Data/information generated or captured by the mobile computing device 650 and stored via the system 602 may be stored locally on the mobile computing device 650, as described above, or the data may be stored on any number of storage media that may be accessed by the device via the radio 672 or via a wired connection between the mobile computing device 650 and a separate computing device associated with the mobile computing device 650, for example, a server computer in a distributed computing network such as the Internet. As should be appreciated such data/information may be accessed via the mobile computing device 650 via the radio 672 or via a distributed computing network. Similarly, such data/information may be readily transferred between computing devices for storage and use according to well-known data/information transfer and storage means, including electronic mail and collaborative data/information sharing systems.

FIG. 7 is a simplified block diagram of a distributed computing system in which various embodiments may be practiced. The distributed computing system may include number of client devices such as a computing device 703, a tablet computing device 705 and a mobile computing device 710. The client devices 703, 705 and 710 may be in communication with a distributed computing network 715 (e.g., the Internet). A server 720 is in communication with the client devices 703, 705 and 710 over the network 715. The server 720 may store rate controller application 700 which may be perform routines including, for example, multi-layered rate control for scalable video coding, as described above with respect to the operation in routine 400 of FIG. 4. Content developed, interacted with, or edited in association with the rate controller application 700 may be stored in different communication channels or other storage types. For example, various documents may be stored using a directory service 722, a web portal 724, a mailbox service 726, an instant messaging store 728, or a social networking site 730.

The rate controller application 700 may use any of these types of systems or the like for enabling data utilization, as described herein. The server 720 may provide the rate controller application 700 to clients. As one example, the server 720 may be a web server providing the rate controller application 700 over the web. The server 720 may provide the rate controller application 700 over the web to clients through the network 715. By way of example, the computing device 10 may be implemented as the computing device 703 and embodied in a personal computer, the tablet computing device 705 and/or the mobile computing device 710 (e.g., a smart phone). Any of these embodiments of the computing devices 703, 705 and 710 may obtain content from the store 716.

Various embodiments are described above with reference to block diagrams and/or operational illustrations of methods, systems, and computer program products. The functions/acts noted in the blocks may occur out of the order as shown in any flow diagram. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A computer-implemented method of multi-layered rate control for scalable video coding of a video stream, wherein the video stream comprises at least one frame and the at least one frame comprises a lower layer and at least one higher layer, the method comprising:
    calculating, by a computing device, a parameter value for the lower layer based on a target bit rate for the lower layer and a buffer state for the lower layer;
    calculating, by a computing device, a parameter value for the at least one higher layer based on a target bit rate for the at least one higher layer and a buffer state for the at least one higher layer;
    determining, by the computing device, whether a current layer is the lower layer;
    upon determining that the current layer is the lower layer, determining whether a coupling request has been received from the at least one higher layer in the frame;
    upon determining that the coupling request has been received from the at least one higher layer in the frame, increasing the parameter value for the lower layer to form an increased parameter value for the lower layer based on a buffer state threshold value for the at least one higher layer in the frame; and
    encoding the video frame based at least on the increased parameter value for the lower layer.

2. The computer-implemented method of claim 1, further comprising:
    determining, by the computing device, whether the current layer is the at least one higher layer;
    upon determining that the current layer is the at least one higher layer, determining whether a delta parameter value between the parameter value for the lower layer and the parameter value for the at least one higher layer exceeds a maximum delta parameter value; and
    upon determining that the delta parameter value exceeds the maximum delta parameter value, triggering layer coupling between the at least one higher layer and the lower layer.

3. The computer-implemented method of claim 2, further comprising:
    determining whether the delta parameter value is equal to the maximum delta parameter value;
    determining whether the buffer state for the lower layer exceeds a buffer state threshold value for the lower layer; and
    triggering layer coupling between the at least one higher layer and the lower layer when the delta parameter value is equal to the maximum delta parameter value and the buffer state for the lower layer exceeds the buffer state threshold value for the lower layer.

4. The computer-implemented method of claim 2, further comprising:
    determining whether the parameter value for the lower layer is decreasing as compared to a parameter value for a previous frame of the video stream;
    determining whether the buffer state for the lower layer is less than a second buffer state threshold value for the lower layer; and
    turning off layer coupling between the at least one higher layer and the lower layer when the parameter value for the lower layer is decreasing as compared to a previous frame of the video stream and the buffer state for the lower layer is less than a second buffer state threshold value for the lower layer.

5. The computer-implemented method of claim 1, wherein the parameter value for the lower layer comprises a quantization parameter value and the parameter value for the at least one higher layer comprises a quantization parameter value.

6. The computer-implemented method of claim 1, wherein increasing the parameter value for the lower layer to form an increased parameter value for the lower layer further comprises:
    setting the increased parameter value for the lower layer to equal the parameter value for the at least one higher layer when the buffer state for the at least one higher layer exceeds the buffer state threshold value for the at least one higher layer.

7. The computer-implemented method of claim 1, wherein increasing the parameter value for the lower layer to form an increased parameter value for the lower layer further comprises:
  setting the increased parameter value for the lower layer to equal one less than the parameter value for the at least one higher layer when the buffer state for the at least one higher layer exceeds a second buffer state threshold value for the at least one higher layer, wherein the second buffer state threshold value for the at least one higher layer is less than the buffer state threshold value for the at least one higher layer.

8. The computer-implemented method of claim 1, wherein the buffer state for the lower layer comprises a buffer fullness value for a lower layer buffer and the buffer state for the at least one higher layer comprises a buffer fullness value for a higher layer buffer.

9. A computing device comprising:
  a memory for storing executable program code; and
  a processor, functionally coupled to the memory, the processor being responsive to computer-executable instructions contained in the program code and operative to:
    determine a parameter value for a lower layer of a video frame based on a target bit rate and a buffer state for the lower layer;
    determine a parameter value for at least one higher layer of the video frame based on a target bit rate and a buffer state for the at least one higher;
    determine whether a current layer is the lower layer;
    upon determining that the current layer is the lower layer,
      determine whether a coupling request has been received from the at least one higher layer in the video frame;
      increase the parameter value for the lower layer to form an increased parameter value for the lower layer based on a buffer state threshold value for the at least one higher layer in the video frame; and
    encode the video frame based at least on the increased parameter value for the lower layer.

10. The computing device of claim 9, wherein the processor is further operative to:
  determine whether a delta parameter value between the parameter value for the lower layer and the parameter value for the at least one higher layer exceeds a maximum delta parameter value; and
  trigger layer coupling between the at least one higher layer and the lower layer when it is determined that the delta parameter value exceeds the maximum delta parameter value.

11. The computing device of claim 10, wherein the processor is further operative to:
  set the increased parameter value for the lower layer to equal the sum of the delta parameter value and the parameter value for the lower layer.

12. The computing device of claim 10, wherein the processor is further operative to:
  determine the parameter value for the lower layer of the video frame based on the target bit rate for the lower layer, the buffer state for the lower layer, and one or more sizes of one or more previously encoded frames; and
  determine the parameter value for the at least one higher layer of the video frame based on the target bit rate for the at least one higher layer, the buffer state for the at least one higher layer, and one or more sizes of one or more previously encoded frames.

13. The computing device of claim 9, wherein the parameter value for the lower layer comprises a quantization parameter value and the parameter value for the at least one higher layer comprises a quantization parameter value.

14. The computing device of claim 9, wherein the at least one higher layer comprises a first higher layer and a second higher layer and the processor is further operative to:
  determine a parameter value for the first higher layer of the video frame based on a target bit rate and a buffer state for the first higher layer; and
  determine a parameter value for the second higher layer of the video frame based on a target bit rate and a buffer state for the second higher layer.

15. The computing device of claim 9, wherein the processor is further operative to:
  set the increased parameter value for the lower layer to equal the parameter value for the at least one higher layer when the buffer state for the at least one higher layer exceeds the buffer state threshold value for the at least one higher layer.

16. The computing device of claim 9, wherein the processor is further operative to:
  set the increased parameter value for the lower layer to equal one less than the parameter value for the at least one higher layer when the buffer state for the at least one higher layer exceeds a second buffer state threshold value for the at least one higher layer, wherein the second buffer state threshold value for the at least one higher layer is less than the buffer state threshold value for the at least one higher layer.

17. The computing device of claim 9, wherein the processor is further operative to:
  set the increased parameter value for the lower layer to equal two less than the parameter value for the at least one higher layer when the buffer state for the at least one higher layer exceeds a third buffer state threshold value for the at least one higher layer, wherein the third buffer state threshold value for the at least one higher layer is less than a second buffer state threshold value for the at least one higher layer.

18. A computing device comprising:
  a processor;
  memory communicatively coupled to the processor, the memory storing computer-executable instructions for causing the processor to:
    calculate a base layer quantization parameter value for a base layer of a video frame based on a target bit rate and a buffer state for the base layer;
    calculate an enhancement layer quantization parameter value for an enhancement layer of a video frame based on a target bit rate and a buffer state for the enhancement layer;
    determine whether a current layer is the base layer;
    when it is determined that the current layer is the base layer,
      determine whether a coupling request has been received from the enhancement layer in the video frame;
      increase the quantization parameter value for the base layer to form an increased quantization parameter value for the base layer based on a buffer state threshold value for the enhancement layer when it is determined that the coupling request has been received from the enhancement layer;

when it is determined that the current layer is not the base layer,
    determine whether a delta quantization parameter value between the base layer quantization parameter value and the enhancement layer quantization parameter value exceeds a maximum delta;
    trigger layer coupling between the enhancement layer and the base layer when it is determined that the delta quantization parameter value exceeds the maximum delta; and
encode video based at least on the increased quantization parameter.

19. The computing device of claim 18, further comprising computer-executable instructions for causing the processor to:
    set the increased parameter value for the lower layer to equal the parameter value for the at least one higher layer when the buffer state for the at least one higher layer exceeds the buffer state threshold value for the at least one higher layer;
    set the increased parameter value for the lower layer to equal one less than the parameter value for the at least one higher layer when the buffer state for the at least one higher layer exceeds a second buffer state threshold value for the at least one higher layer; and
    set the increased parameter value for the lower layer to equal two less than the parameter value for the at least one higher layer when the buffer state for the at least one higher layer exceeds a third buffer state threshold value for the at least one higher layer.

20. The computing device of claim 19, wherein the buffer state threshold value is 90% fullness for a lower layer buffer, the second the buffer state threshold value is 80% fullness for the lower layer buffer, and the third buffer state threshold value is 70% fullness for the lower layer buffer.

21. The computing device of claim 18, further comprising computer-executable instructions for causing the processor to:
    set the increased parameter value for the lower layer to equal the sum of the parameter value for the enhanced layer and a minimum delta quantization parameter when it is determined that the quantization parameter value for the lower layer is less than the minimum delta quantization parameter.

* * * * *